Patented July 22, 1941

2,249,761

UNITED STATES PATENT OFFICE 2,249,761

ACID PROCESS FOR THE EXTRACTION OF ALUMINA

Arthur W. Hixson, Leonia, N. J., and Ralph Miller, New York, N. Y., assignors to The Chemical Foundation, Incorporated, a corporation of Delaware No Drawing. Application August 5, 1938, Serial No. 223,234

1 Claim. (Cl. 23—87)

This invention relates to a process of securing alumina from aluminous materials by treatment with hydrochloric acid.

The present method of extracting alumina from bauxite is an alkaline process. Although there is considerable merit in an alkaline process, it suffers the disadvantage of being limited in its application to bauxite, which is low in silica. High grade bauxite is not an abundant mineral and its scarcity is one of the principal reasons for the costliness of metallic aluminum. Aluminum ores are plentiful but nearly all of them contain substantial amounts of silica and some iron. In order to extract alumina from aluminum-containing ores which contain substantial amounts of silica, it is necessary that an acid process be employed. When an aluminum ore which contains iron is attacked by an acid, both the aluminum and iron dissolve. Alumina that is to be used for producing metallic aluminum must contain less than .05 percent of iron oxide. This requirement has prevented the adoption of any of the multitude of acid processes for the extraction of alumina that have been proposed because the separation of the iron from the aluminum has always been such an expensive operation that the final cost of the acid extraction process has been greater than an alkaline process.

This invention is concerned with an acid process for extracting alumina containing less than .05 percent. ferric oxide from aluminous material. The novel sequence of operations, to be described more fully later, consists of the following steps: A preliminary roast of the ore; digestion of the ore with hydrochloric acid; separation of the acid solution from the insoluble residue; separation of the dissolved iron from the dissolved aluminum by means of a selective organic solvent immiscible in water; evaporation of the aluminum chloride solution until a substantial quantity of solid, hydrated aluminum chloride forms, separation of the solid salt from the solution; and thermal decomposition of the solid, hydrated aluminum chloride to form hydrogen chloride gas plus pure anhydrous alumina.

This process is distinguished from any of the other processes that have been proposed hitherto in that it accomplishes the necessary separation of the iron from the aluminum completely in the liquid phase. What makes this method especially noteworthy is that this separation may be carried out using concentrated aluminum chloride solutions. As a corollary to this use of concentrated salt solutions, important heat economies may be accomplished. It was the absence of this advantageous condition of concentration which made all the other processes prohibitively expensive, for they all employed dilute solutions. What formerly was the most time-consuming, expensive step is now replaced by a simple, almost costless, operation. Without an adequate, inexpensive, method of purifying the aluminum salt solution, an acid process for extracting alumina is doomed to failure. All the other advantages of this process stem from this departure from the classical methods that have been utilized before.

The reason for the preliminary roast is to destroy any organic matter, increase the solubility of the alumina, and to decrease the tendency of the silica to go into solution.

The ore is then treated with hydrochloric acid. This is conveniently done by means of a continuous counter-current leaching system. Heat may be applied to increase the rate of solution. If 20% hydrochloric acid is used, about a 21% aluminum chloride solution will be formed. The salt solution is separated from the insoluble residue by filtration or in any other convenient manner.

The aluminum chloride solution is contaminated with iron. The separation of the iron from the aluminum requires that the iron be in the ferric state. The iron is then separated from the solution by means of a selective organic solvent immiscible in water. For example, the acid solution of aluminum and ferric chlorides is contacted with a selective organic solvent such as butyl acetate, or methyl butyl ketone, or proprionitrile, or amyl alcohol or ethylacetate, or a mixture of these solvents, or any of the other selective organic solvents which are substantially immiscible in water and non-reactive with the solutions employed, and which have a preferential affinity for iron. The liquids are allowed to settle and the phases separated. The ferric chloride will be found in the organic solvent phase. This separation is most conveniently carried out in a continuous counter-current extraction system.

The aluminum chloride solution is evaporated until a substantial quantity of solid, hydrated aluminum chloride is formed. The solid is separated from the remaining solution. If it is desired, the crystals are washed with strong hydrochloric acid saturated with aluminum chloride.

The solid, crystalline, hydrated aluminum chloride is then thermally decomposed to form hydrogen chloride and anhydrous pure aluminum oxide.

The hydrogen chloride gas is absorbed in water to form hydrochloric acid, which is employed to treat additional ore. In this way, the loss of hydrochloric acid is that which is consumed by the acid soluble materials in the ore, exclusive of alumina.

The organic selective solvent containing ferric chloride is purified for reuse by washing it with water. By this simple expedient the iron is permanently removed from the process. This washing is economically carried out in a continuous counter-current manner. This step achieves that which was impossible of attainment by any other method, the separation of the iron from the aluminum practically completely without the formation of any precipitate.

When the aluminum chloride solution is evaporated, any dissolved organic selective solvent will be steam distilled. The vapor is condensed and the organic selective solvent separated from the water condensate. The water condensate may then be reused in the process. After the evaporation is halted, the remaining liquid which is separated from the solid aluminum chloride is returned to the process by adding it to the aluminum chloride solution about to be contacted with the selective organic solvent.

If the aluminum chloride crystals are washed with strong hydrochloric acid saturated with aluminum chloride, the acid solution will become contaminated with ferric chloride. This ferric chloride is extracted from the acid solution by a selective organic solvent immiscible in water, such as isopropyl ether. The acid solution freed from iron is recycled. The isopropyl ether or other selective solvent is stripped of its iron content by extracting the ferric chloride with water. The isopropyl ether is then recycled.

When this process was applied to an aluminum ore having a high iron content, alumina was produced containing less than .006 percent. ferric oxide.

Reference has been made to the fact that this process is capable of handling concentrated aluminum chloride solutions. As a means of securing these concentrated salt solutions, a counter-current leaching system has been mentioned. Before the insoluble residue is discarded, irrespective of the manner in which the ore is treated with hydrochloric acid, it is necessary that the ore be washed in order to prevent the loss of acid or dissolved aluminum chloride. This wash water, at some stage in the process, is employed to absorb the hydrogen chloride formed when the hydrated aluminum chloride is decomposed. For example, a series of six Dorr counter-current thickeners with all the necessary auxiliary equipment may be used to leach the ore with hydrochloric acid. The slightly acid solution, concentrated with aluminum chloride, will contact fresh ore in the last of the thickeners before being contacted with the selective organic solvent. Wash water will be added to the system in the first thickener before the ore is discarded. The clear liquid from the third thickener, however, will not pass to the fourth thickener but will be conducted to the gas-absorbing equipment, fortified with hydrogen chloride and then conducted to the fourth thickener. By this means, concentrated aluminum chloride solutions may be formed without any evaporation.

Although the selective organic solvents specified for this process are described as being immiscible in water, nevertheless, they do dissolve to a small extent. The solvent that dissolves in the salt solution is recovered in the indicated manner. The solvent which dissolves in the water employed to wash out the iron would be lost if the water were immediately discarded. One way to decrease this loss is to recycle the wash water. Obviously, the wash water would soon contain so much ferric chloride that it would no longer be possible for it to remove the iron contained in the selective organic solvent. To prevent this occurrence, the iron in the wash water is reduced to the ferrous state by scrap iron, sulfur dioxide, electrically or by any other reducing agent.

The term "organic solvent," as used in the claim, is to be interpreted as defining those liquid organic compounds which are substantially immiscible with water and non-reactive with the solutions employed; and which have a preferential affinity for iron.

Having thus described our invention, we claim as new:

In a process of treating aluminum ores with hydrochloric acid, the steps consisting in separating the resulting solution from the insoluble residue; contacting the solution with a selective organic solvent immiscible in water, whereby the iron content of the water solution is extracted; separating the water solution from the organic solvent containing the iron; contacting the organic solvent solution with a water solution; recycling the organic solvent; and then treating the water solution containing the iron with a reducing agent to reduce the iron content to the ferrous state and recycling the water solution.

ARTHUR W. HIXSON.
RALPH MILLER.